United States Patent
Rieber

(10) Patent No.: US 10,328,911 B1
(45) Date of Patent: Jun. 25, 2019

(54) AUXILIARY MOUNTING STABILIZER

(71) Applicant: Michael S. Rieber, Parker, CO (US)

(72) Inventor: Michael S. Rieber, Parker, CO (US)

(*) Notice: Subject to any disclaimer, the term of this patent is extended or adjusted under 35 U.S.C. 154(b) by 0 days.

(21) Appl. No.: 16/161,570

(22) Filed: Oct. 16, 2018

Related U.S. Application Data

(60) Provisional application No. 62/573,146, filed on Oct. 16, 2017.

(51) Int. Cl.
*G05G 1/34* (2008.04)
*B60T 7/06* (2006.01)
*B60K 23/00* (2006.01)

(52) U.S. Cl.
CPC .......... *B60T 7/06* (2013.01); *G05G 1/34* (2013.01); *B60K 2023/005* (2013.01)

(58) Field of Classification Search
CPC ........ B60T 7/06; G05G 1/34; B60K 2023/005
See application file for complete search history.

(56) References Cited

U.S. PATENT DOCUMENTS

| | | | |
|---|---|---|---|
| 2,395,280 A | 2/1946 | Law | |
| 2,597,379 A | 5/1952 | Romel | |
| 2,694,946 A | 11/1954 | Vandal | |
| 2,819,627 A | 1/1958 | Larson | |
| 3,313,110 A * | 4/1967 | Von Rohr | B60K 23/00 180/322 |
| 7,207,238 B2 | 4/2007 | Feng | |
| 8,607,602 B1 | 12/2013 | Okoye | |
| 9,637,095 B2 | 5/2017 | Blank | |

FOREIGN PATENT DOCUMENTS

| | | | | |
|---|---|---|---|---|
| DE | 19907520 A1 * | 8/2000 | | G05G 1/34 |
| EP | 0583759 B1 * | 3/1997 | | B60K 23/00 |
| EP | 0949554 A2 * | 10/1999 | | G05G 1/30 |

* cited by examiner

*Primary Examiner* — Vicky A Johnson
(74) *Attorney, Agent, or Firm* — Kyle W. Rost

(57) ABSTRACT

An auxiliary brake stabilizing support carries an instructor's brake in a given car. The support interacts with both the floor section and the firewall section of a car in front of the passenger seat, without necessarily being secured to these sections by penetrating fasteners. The brake support fits against a firewall of a car and is elevated with respect to the firewall to carry the brake over a passage with open lateral edges and supporting standoffs at top and bottom edges of the platform. A massive anchor plate rests against the floor at the base of the firewall to resist slippage. A hinged connection between the platform and anchor plate allow precise fit with the configuration of the car, while allowing the stabilizing support to fold into a compact shipping configuration.

17 Claims, 5 Drawing Sheets

AUXILIARY MOUNTING STABILIZER

BACKGROUND OF THE INVENTION

Field of the Invention

The invention generally relates to a machine element or mechanism and more specifically to control lever and linkage systems. In another aspect, the invention relates to vehicle brake control systems or parts thereof and brake action initiating means with foot actuated disposition of the pedal. In a further aspect, the invention relates to vehicle fittings. More specifically, the invention is directed to double foot controls, e.g., for instruction vehicles.

Description of Related Art

The conditions for operating a motor vehicle on public roads are controlled by law. Each state is entitled to establish the conditions precedent for a new driver to obtain driving privileges. State laws often follow a Graduated Driver Licensing (GDL) program. While the details of conditions established in the various states following a GDL program might vary, the required steps for a new driver to become entitled to drive often are categorized into three stages. First, the new driver is in student or learning stage. In this stage, the student must be supervised as he drives. After receiving the requisite supervision and training, the student gains the right to apply for a driver's license from the state. Students who have completed a formal driver's education program often can start this first stage of training at a younger age than those who learn in another way. Second, during an intermediate stage, the newly licensed driver may drive while unsupervised, but for a given period of time he is subject to various limitations applicable to higher risk situations. For example, the newly licensed driver may be prohibited from driving at night and may be limited in driving with passengers. Third, the driver reaches a full privilege stage and receives a standard driver's license.

The present invention applies to the configuration of the vehicle used during the first stage of driver training. A formal driver education program will guard against damage from erratic student driving by providing auxiliary control to the supervising instructor. The most basic type of auxiliary control is a brake pedal at the instructor's position in the training car, such that the car has a dual brake system. For a driving school, equipping the training cars with a dual brake system is sensible and practical, since the training cars are used with many student drivers. Still, installing an auxiliary brake pedal in a car presents difficulty and undesirable consequences, because cars are not designed to accommodate auxiliary brake pedals.

Two types of auxiliary brake pedals have been used. Both provide a brake pedal or other control mechanism at the passenger side of an automobile, which is where the instructor sits. The auxiliary pedal must be connected to the main pedal or brake arm at the driver's side. This connection is key to operation of an auxiliary pedal because the main pedal is the only braking input manufactured into a normal passenger car.

One type of auxiliary pedal operates through a crossbar that crosses from the passenger side to the pedal on the driver's side, in theory allowing the instructor to step on the passenger side of the bar and thereby depress the main brake pedal on the driver's side. U.S. Pat. No. 2,395,290 to Law shows such an arrangement, where the instructor's end of the crossbar is on a loose laid support resting against the floorboard. The driver's end of the crossbar is clamped to the stem of the brake pedal. In operation, the instructor depresses the crossbar itself to depress the main brake pedal, while the support holds up the instructor's end of the crossbar. U.S. Pat. No. 2,694,946 to Vandal shows a variation of that arrangement, using a pair of turnbuckles to clamp the crossbar between the dashboard and floorboard of the car at both the driver's side and the passenger's side. The crossbar has an auxiliary pedal at the passenger's side so that the instructor will apply the main brake by rotating the crossbar rather than depressing it. At the driver's side, the crossbar is attached to the brake pedal by a linkage. U.S. Pat. No. 2,819,627 to Larson shows a crossbar with an auxiliary pedal and a loose laid, hinged, two-plate support at the passenger's side so that the instructor will press the pedal to rotate the crossbar rather than depressing the crossbar. The driver's side of the crossbar is attached to the brake pedal stem to that rotating the crossbar also applies the brake.

These systems using a crossbar do not appear to be useful or practical in many current vehicles. In current car designs, often a central console is present between the driver's and passenger's seats, where the console cuts off communication at floor level between the two seating areas. In other automobile designs, a raised center of the floor, i.e., a drive shaft passage, might cut off floor-level communication. Consequently, a design using a crossbar is ill-suited for use in many modern cars. Also, it would seem that in any era of car design, a crossbar might interfere with the driver's use of the accelerator pedal, which is well known to be located on the passenger's side of the main brake pedal where the crossbar would have to pass it in order to connect to the main brake pedal. In the noted patents to Law, Vandal, and Larson, the drawings illustrate only a flat floor between driver's and passenger's sides of the car, and none of these patents illustrates a means of avoiding the accelerator pedal. The above-described technology may have been limited to an earlier era, to any vehicles that perhaps have a flat floor across the vehicle and an accelerator pedal that luckily is not an obstacle to the crossbar.

While crossbar designs may be impractical, prior designers were attempting to create a desirable result by looselaying the passenger's side support for the crossbar. Bolting the instructor's brake pedal to the floor of the car is undesirable because it causes damage to the car. A design using a crossbar may have offered enough rigidity to allow looselaying the passenger side support because the crossbar contributed to stability between the main brake pedal and the auxiliary brake pedal.

A more modern dual brake system offers a flexible interconnection between the instructor's side brake pedal and the main brake pedal. Instead of a crossbar, a modern system might employ a flexible brake cable to interconnect the instructor's brake pedal with the main brake pedal. The cable can be routed through or around a console, and, likewise, can be routed to avoid interference with the accelerator pedal. U.S. Pat. No. 7,027,238 to Feng shows an auxiliary brake control system in which the instructor's brake pedal is fastened to a raised platform that is loose-laid on the floor of the car. The platform is raised from the car floor by a sidewall, providing room under the platform for fasteners such as screws or bolts to penetrate the platform without striking the floor of the car. A two part cable, having center cable or wire with a surrounding sheath, interconnects the instructor's brake pedal to the main brake pedal. U.S. Pat. No. 9,637,095 to Blank shows another loose-laid platform for the instructor's brake pedal and uses a cable for interconnecting to the main brake pedal. An extension plate is welded to the platform at an angle for supporting the brake pedal from two angled plates.

With cables replacing rods to interconnect the pedals of a dual brake system, there is increased chance that the instructor's loose laid brake pedal or its loose laid supporting platform will become dislocated. From another perspective, the instructor's brake pedal might shift up, down, or sideways while being applied, which may produce undesirable consequences in the effectiveness of applying the instructor's brake. These shifts are increasingly likely the more the contour of the car floor differs from the contour of the brake pedal platform.

It would be desirable to improve the accuracy of the fit between a loose laid brake pedal platform and the passenger floor area of a chosen car.

It would be desirable to provide a loose laid passenger side brake pedal assembly with reduced tendency to slide or become dislocated, especially during application of the brake pedal.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide a stable supporting platform for a portable or temporary brake pedal, such as might be installed on the passenger side of a car.

A more specific object of the invention is to provide a supporting platform for carrying an auxiliary brake pedal in a car or similar vehicle, wherein the platform is adaptable to a sustained, substantially perfect fit with the contours of the vehicle floor.

Another object of the invention is to provide a supporting platform for carrying an auxiliary brake pedal in a car or similar vehicle, wherein the platform maintains a stable position on the vehicle floor by employing selective mass enhancement and distribution.

A related object of the invention is to provide a platform for carrying an auxiliary brake pedal in a car or similar vehicle, wherein the platform is convertible into an efficient configuration for shipping.

According to the invention, an auxiliary brake stabilizer carries an instructor's brake in a given car. The support interacts with both the floor section and the firewall section of the car in front of the passenger seat, without necessarily being secured to these sections by penetrating fasteners. The brake support fits against a firewall of a car and is elevated with respect to the firewall to carry the brake over a passage with open lateral edges and supporting standoffs at top and bottom edges of the platform. A massive anchor plate rests against the floor at the base of the firewall to resist slippage. A hinged connection between the platform and anchor plate allow precise fit with the configuration of the car, while allowing the support to fold into a compact shipping configuration.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

The invention is directed to improvements in auxiliary braking systems in cars and other vehicles where a person other than the driver is provided with a second, supplemental, or auxiliary brake control. For purposes of description, a car will be described as having a main brake pedal and main controls. The main brake is the brake pedal at the driver's position. Similarly, the main controls are controls at the driver's position. Main controls, including a main brake, typically are those that are original equipment on the car, such as those installed at traditional locations during manufacture of the car at the driver's position. An auxiliary brake or supplemental brake typically refers to a brake applicator or pedal at the front seat passenger's position, although it would be possible to have an auxiliary brake mounted anywhere in the car. An auxiliary brake also can be regarded as being a brake other than the main brake and that operates by applying the main brake pedal through a link.

A typical situation where an auxiliary brake control is added to a car can be for driving instruction while the student driver is at the controls, and the instructor is located in the passenger seat. As a safety measure in case the student driver is making an error, the instructor can apply the main brake by using an auxiliary brake control. A suitable auxiliary brake control includes a brake pedal located at the passenger side of the car and operatively linked to the main brake control at the driver's position.

Driving instruction often is conducted by a driving school, although friends or family might instruct a student driver. Regardless of who is instructing, in any situation where the instructor is not at the main controls of the car, having an auxiliary brake for the instructor's use can be an important safety measure. However, permanently installing an auxiliary brake pedal to the floor of a car, such as by bolting down a pedal assembly, causes damage. Therefore, regardless of safety concerns, friends and family may refuse to damage their cars by bolting down a passenger side brake assembly. Even a driving school may wish to avoid such damage to its cars, despite having a larger number of students to train.

Figure 1:
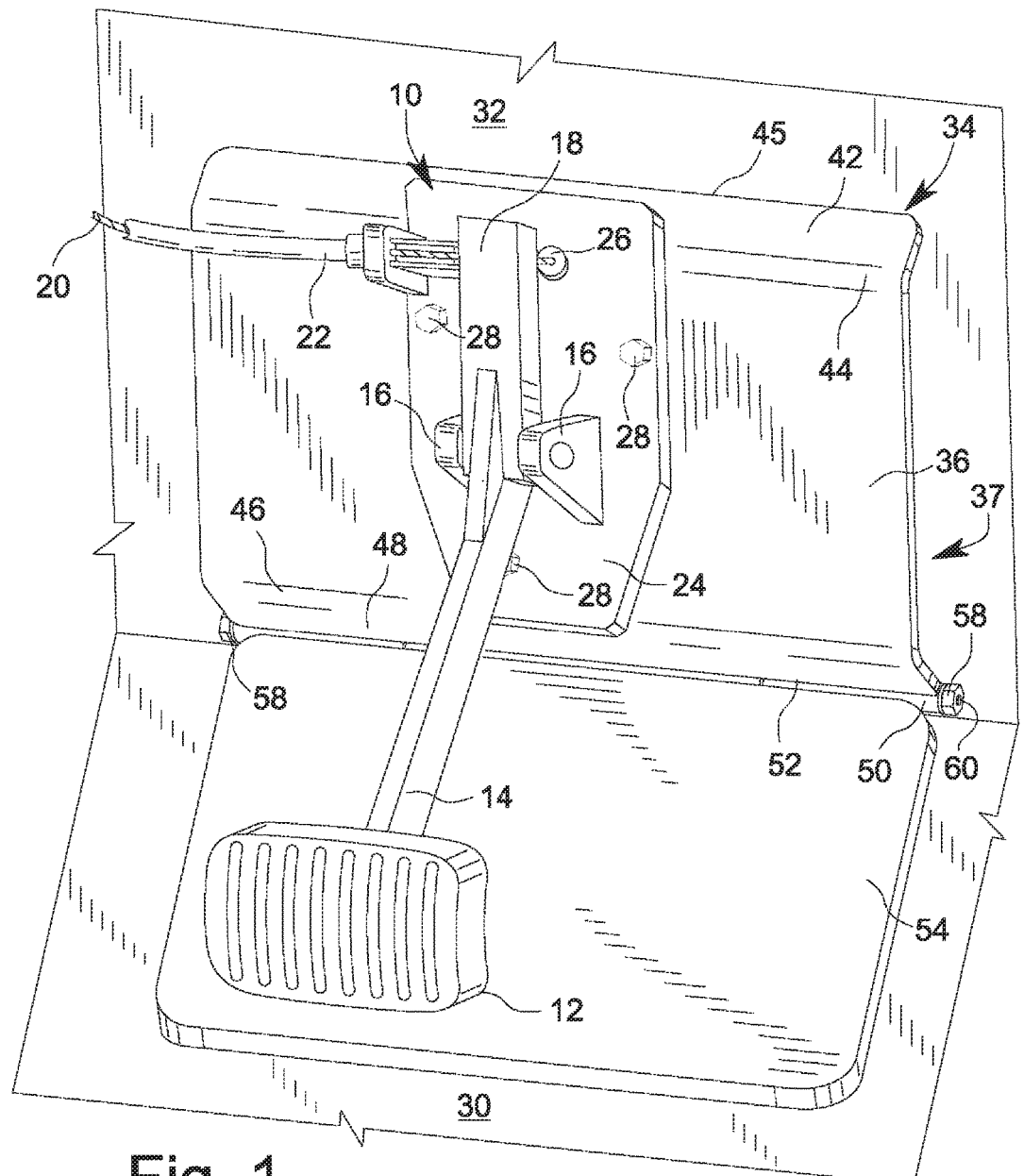
FIG. 1 is an isometric view taken from the front right side, showing an auxiliary brake pedal mounted to a platform that carries the auxiliary brake pedal, and showing surrounding floor and firewall of a car.

A partial solution to the problem of damage is to loose-lay the auxiliary brake assembly at the passenger side of the car. Referring to FIG. 1 of the drawings, and referring to an auxiliary brake assembly 10 as a non-limiting example, a brake pedal or brake pad 12 is carried at a proximal end of a brake arm 14. When depressed, the pad 12 operates the brake arm 14 to pivot on mounts 16 and thereby to raise the rear or distal end 18 of the brake arm 14. A two component cable is formed of a core 20 and outer sheath 22. This cable is connected between the auxiliary brake assembly 10 and the main brake of the car. Raising the distal end 18 of the brake arm 14 pulls the cable core 20 near a proximal end thereof. The cable core 20 is installed with a distal end connected to a main brake, to apply the main brake when pulled. A base plate 24 of the brake assembly 10 carries the mounts 16 and provides an anchor 26 that secures the proximal end of cable core 20. Several fasteners such as screws or bolts 28 fix the base plate 24 to an underlying secure surface. Typical secure surfaces might be the front portion 30 of the floor pan of a car or a firewall 32 of the car, although bolting through these secure surfaces is contrary to the concept of loose-laying the auxiliary brake assembly and will damage the permanent structure of the car. Therefore, the invention provides a secure stabilizing surface other than the floor 30 or firewall 32, such that installing a brake assembly 10 will not damage the integrity of the car.

In a typical car, the base area in front of the passenger seat is a flat floor section 30, typically regarded as part of the floor pan. In front of flat floor section is an upward and forward angling surface that will be referred to as being part of the firewall surface 32. The invention is a stabilizing assembly providing a platform for engaging an auxiliary brake 34 control, where the assembly interacts with both the floor section 30 and the firewall section 32 of a car in front of the passenger seat, without necessarily being secured to these sections by penetrating fasteners.

Figure 2:
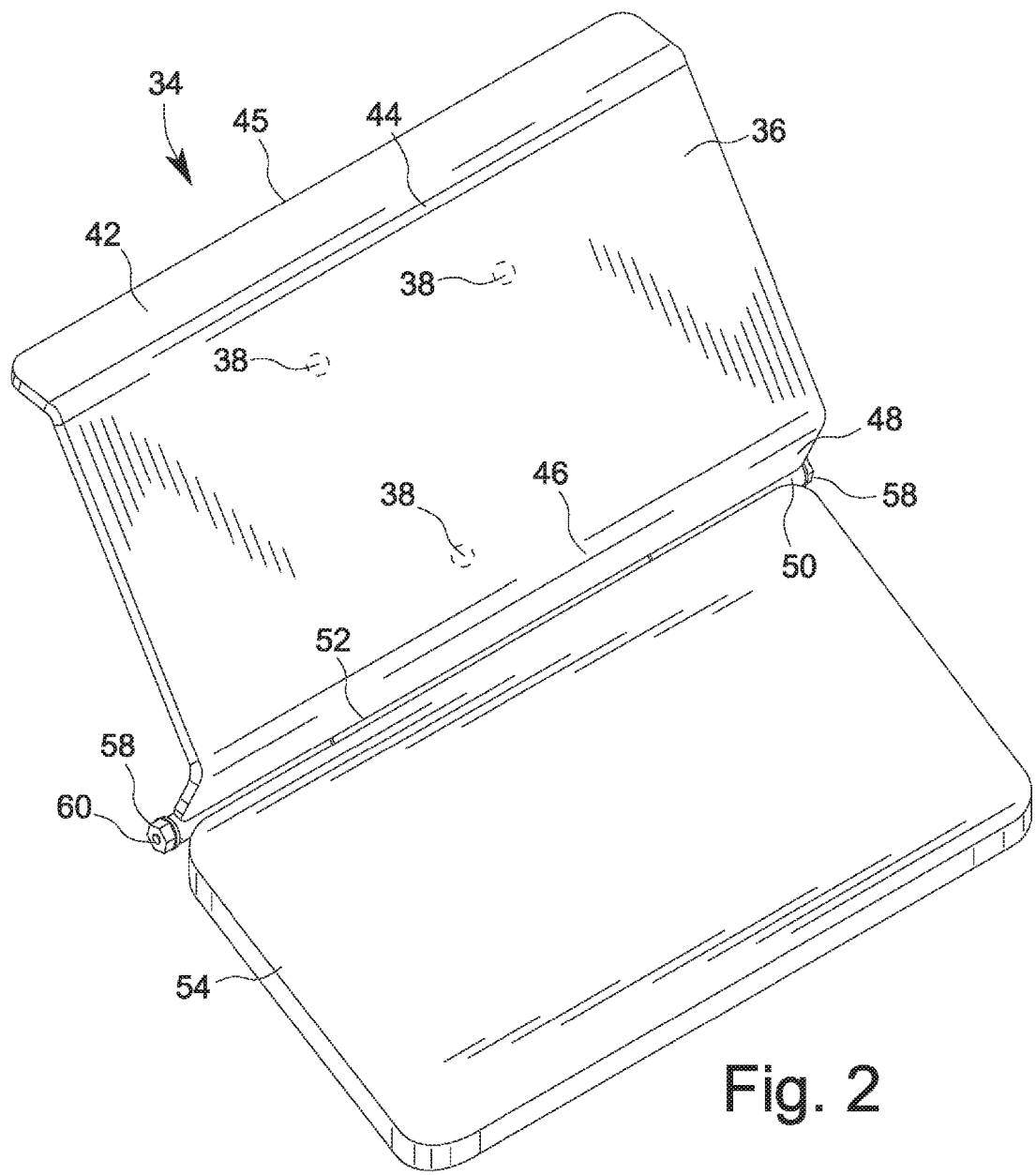
FIG. 2 is an isometric view of a platform for an auxiliary brake pedal and shown in deployed position, taken from the front left thereof.
Figure 3:
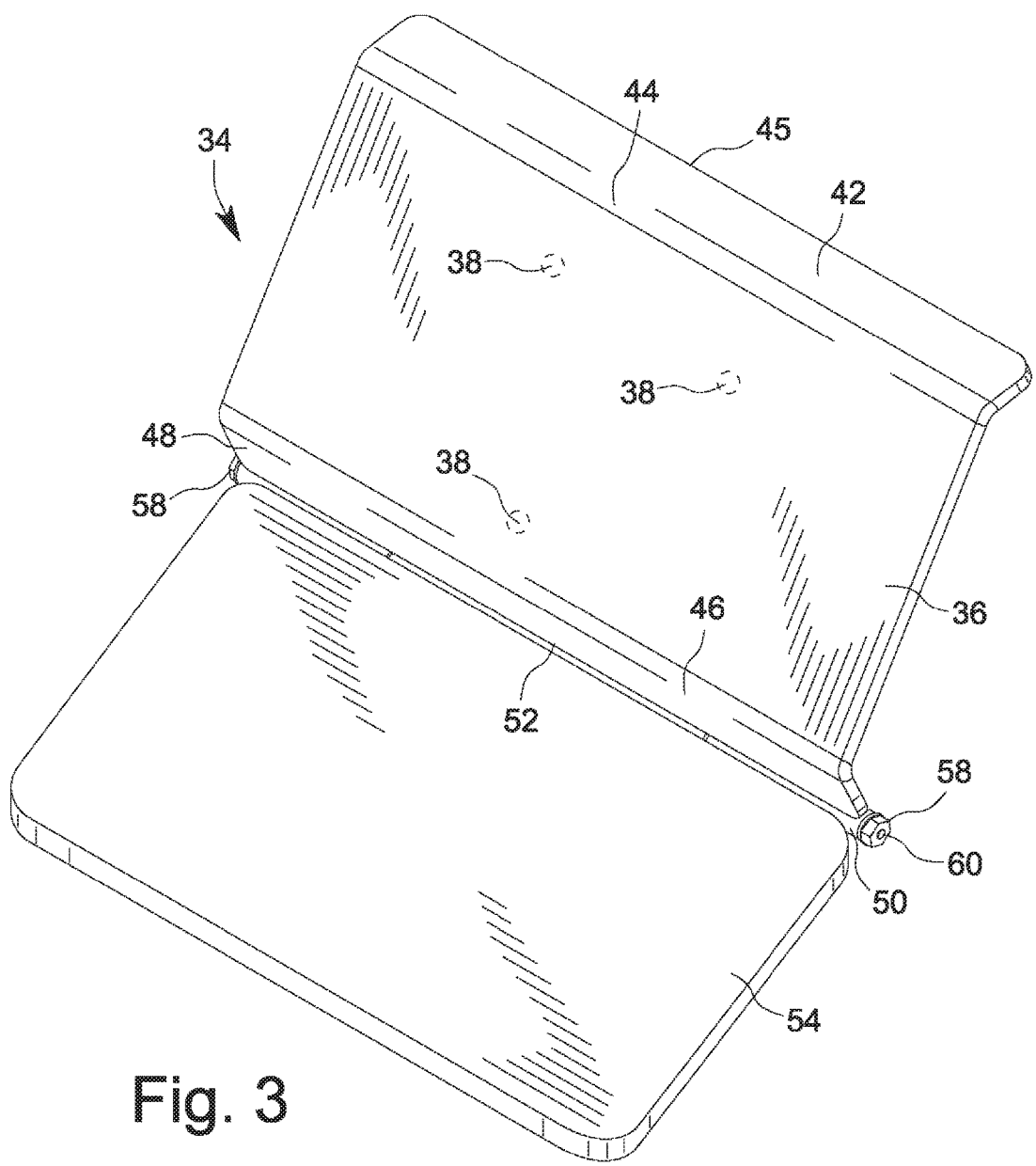
FIG. 3 is an isometric view of a platform for an auxiliary brake pedal and shown in a deployed position, taken from the front right thereof.
Figure 4:
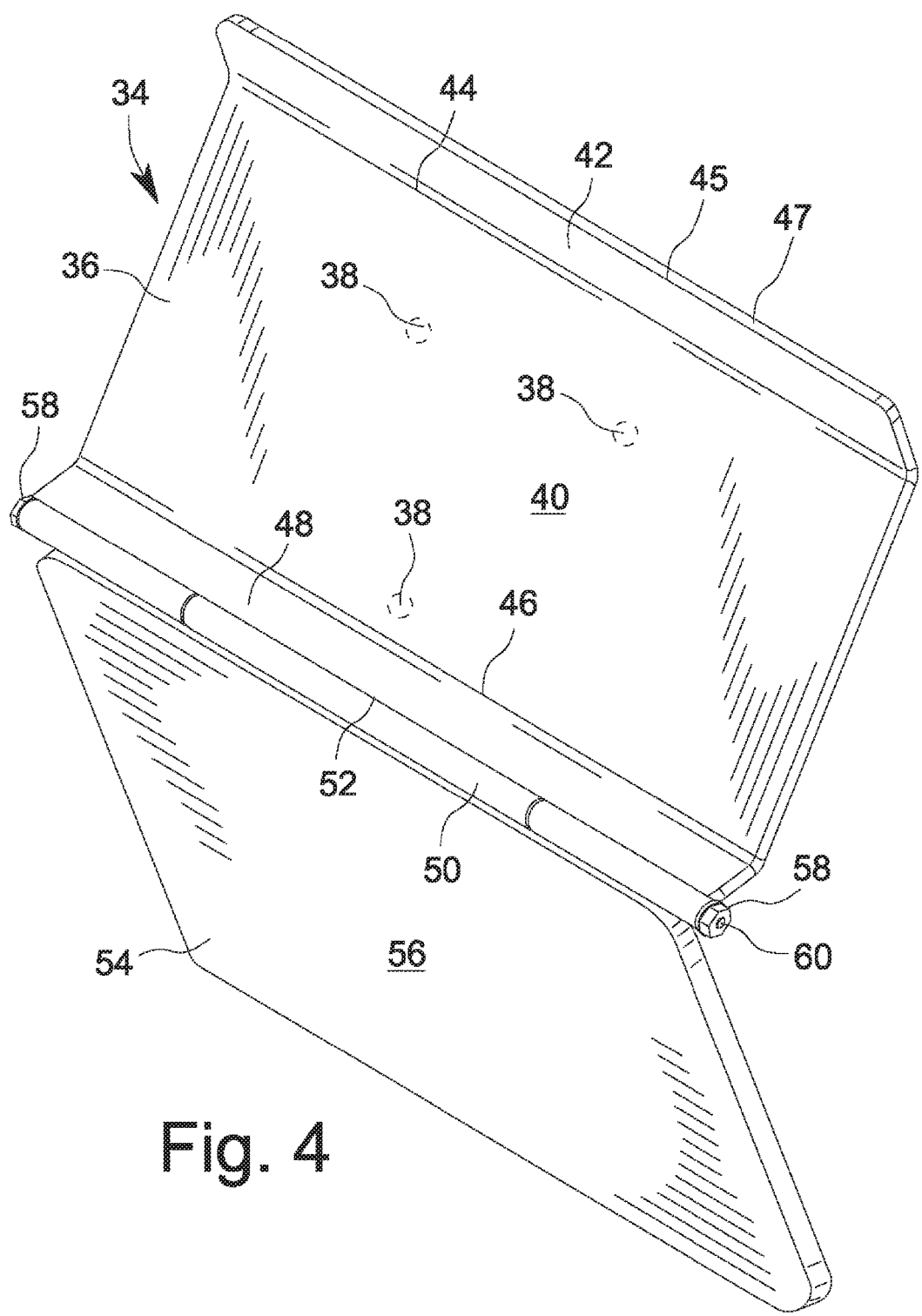
FIG. 4 is an isometric view of a platform for an auxiliary brake pedal and shown in a deployed position, taken from the lower right rear thereof.

Referring to FIGS. 1-4, the stabilizing assembly 34 provides a platform 36 serving as an anchor for the auxiliary brake assembly 10. FIGS. 2-4 illustrate in dashed lines several possible reception locations 38 for penetrating fasteners attaching the auxiliary brake assembly 10 to the stabilizing assembly. The number and type of fastener locations 38 and the positions of the fastener locations 38 are variable according to needs or design of the chosen auxiliary brake assembly 10. The auxiliary brake assembly 10 illustrated in FIG. 1 is shown merely as an example and is fastened to platform 36 by three fasteners 28, located in similar positions to the suggested fastener locations 38 in FIGS. 2-4. Platform 36 can be modified as required to securely hold an auxiliary brake assembly 10 even with a fastening system other than screws or bolts.

Platform 36 is elevated, such that there is a space 37 under the platform, spacing the platform above the underlying support surface of the car, which may be the firewall surface 32. It is desirable that platform 36 be elevated by space 37 because the elevation leaves room on the back side of the platform for rearward placed objects, such as fastener run outs. For example, if bolts 28 secure base 24 to the front face of platform 36 as shown in FIG. 1, a portion of each bolt 28 likely extends through the platform and out the rear face 34, FIG. 4, of the platform. If the bolts are secured by nuts, then the nuts are behind the platform and resting against the rear face 40. If screws secure base 24 to the platform, a run out portion of the screws likely extends through the platform and out the rear face 40. Screws, bolts, and bolts carrying nuts are suggested merely as examples of objects that might extend behind the platform.

Another type of object, whether or not it is a fastener or fastening system and whether or not it is related to the auxiliary brake, might similarly benefit from placement or passage in or through space 37 behind front face 36 of the platform. Elevation of the platform 36 provides reception space 37 for lateral passage of an object or earward placement of an object without requiring that the object be compressed between the platform and the floor or firewall of the car. The reception space 37 has open lateral sides for receiving or passing suitable objects.

In use, a stable offset system establishes and maintains the elevation of the platform 36 at a predetermined spacing 37 from the underlying surface 32 of the vehicle on which the platform is placed. The offset system extends behind the platform for a suitable distance, such as the thickness of the predetermined spacing 37. A spacing or elevation of about one inch behind platform 36 is suitable. The preferred offset system includes a first lower spacer depending from the planar platform 36 at the forward edge thereof. This first spacer may be top edge wall 42 at the high edge 44 of platform 36 as it is disposed on an upwardly angling firewall 32 of a car, as illustrated in FIGS. 1-3. Wall 42 may be a continuous portion of a single sheet of material that also forms the platform 36. Such a continuous top edge wall 42 may be formed by bending a segment of the sheet material of the platform 36. The angle of the bend and the length of the wall segment 42 determine the elevation of the platform at its top edge 44.

The wall 42 defines a contact edge 45 that can form a retention groove in underlying surfaces such as firewall 32, especially where the firewall is covered by a deformable covering such as carpeting. As an example, the wall 42 might be disposed at an acute angle with respect to the platform, such as forty-five degrees. The outer edge 45 of the wall 42 might be configured with a suitable edge angle, such as perpendicular to the plane of the wall 42. In this example, when the platform is resting against the firewall, the contact edge 45 applies a sharp edge against any underlying carpeting. The sharp edge will be defined by intersecting plane surfaces, each angled at about forty-five degree from the surface of the carpeting. The retention groove formed by pressure of the sharp edge will tend to retain the position of the platform on the firewall 32 and thereby to prevent the platform from sliding or becoming dislocated in the passenger compartment of the car.

Figure 5:
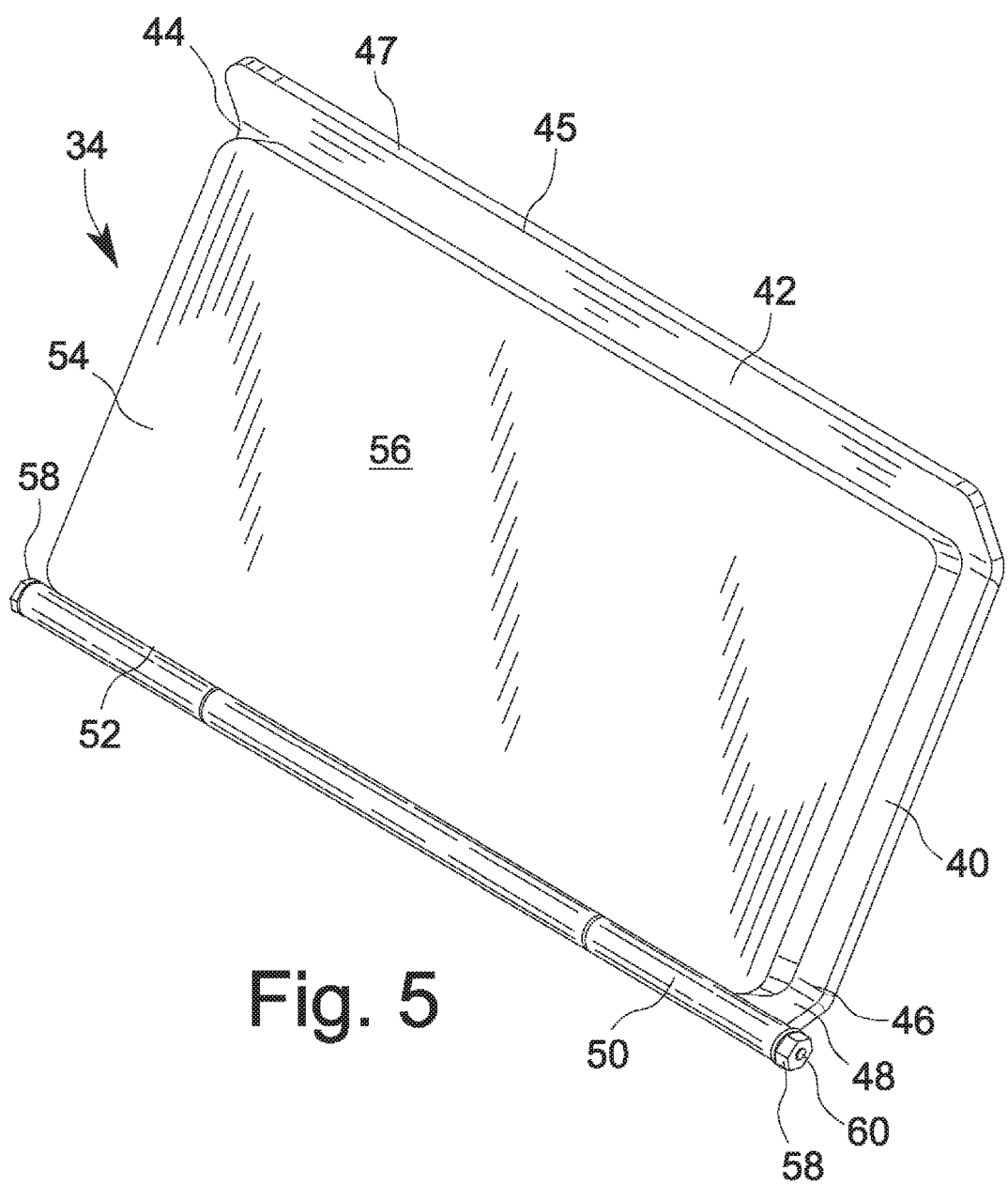
FIG. 5 is an isometric view of a platform for an auxiliary brake pedal and shown in a folded, compact position, taken from the right rear thereof.

The sharp contact edge 45 can be formed efficiently during fabrication of the platform 36. The platform 36 and top or forward end wall 42 can be formed from a single, continuous, planar sheet of strong sheet material such as steel. Such sheet material is typically defined by parallel top and bottom major surfaces, such as top and bottom surfaces 36 and 40 as shown in FIGS. 2 and 4. In the forming process, the narrow edges 47 of the single sheet can be square cut and planar, such that the narrow, square cut edges 47 are perpendicular to the major, top and bottom surfaces of the end wall 42. The intersection of the square cut end edges 47 and major surfaces of the end wall define sharp edges. The gripping sharp edge 45 is defined between such an end edge 47 and the lower face of end wall 42, as best shown in FIGS. 4 and 5. The end wall 42 can be bent down from the major platform sheet surface 36, forming bend 44. If the end wall 42 is bent down by forty-five degrees, the resulting lowermost sharp edge 45 will become the contact edge. Edge 45 is disposed along a sharp pointed or wedge shaped intersection of the narrow cut edge 47 and bottom surface of the end wall 42. The positioning of this efficiently formed, sharp contact edge 45 near the forward or top edge of the platform 36 is effective due to the lateral orientation of the contact edge 45, where it will be disposed across the slope of an inclined firewall, as best shown in FIG. 1.

As described, the preferred method of forming the depending forward end wall 42 on platform 36 is by bending down a portion of the platform to define the end wall 42. Other forming techniques can be used. For example, the end wall 42 can be separate from the platform 36 and joined to the platform by a fastening technique, such as welding. The downward angle of the end wall 42 need not be forty-five degrees. An end wall with any downward angle will produce elevation of the platform. Similarly, any downward angle will produce a contact edge 45. The illustrated end wall 42 is preferred because it interacts with the host car to grip a retention groove without inflicting undue damage or wear on the car. However, the end wall might be configured with more aggressive engagement structures such as serrations, teeth, or prongs to engage an underlying carpet of the car.

Optionally, the platform 36 also is supported from a low edge 46 by a bottom edge wall 48 at what would be the low edge 46 of platform 36 as it is disposed on an upwardly angling firewall of a car and as illustrated in FIGS. 1-3. Wall 48 may be a continuous portion of a single sheet of material that also forms the platform. Such a continuous bottom edge wall 48 may be formed by bending a segment of the sheet material of the platform. The angle of the bend and the length of the wall segment 48 determine, in part, the elevation of the platform at its bottom edge wall 48. The bottom edge wall 48 is a sample of a second lower spacer depending from the planar platform 36 at the rearward end thereof. In use, the lower spacer maintains the rearward edge of platform 36 in an elevated position relative to the underlying firewall surface of the car. In one embodiment, the platform 36 and the top and bottom edge walls 42,48 are symmetrical, in that both top and bottom edge walls are of equal size and are bent below the platform at equal angles, as illustrated in FIGS. 1-4.

A transverse hinge 50 is attached to the platform 36 at or near the bottom 46. The hinge 50 may be formed of two hinge leaves with hinge knuckles attached to pivot on the axis of a hinge pin. Such a hinge may be attached to the platform by a first one of the leaves associated with a first set of alternating knuckles. Alternatively, the hinge may be formed of hinge knuckles, with a first alternating knuckle(s) directly joined to the platform. Bottom edge wall 48, where present, may be intermediate to the hinge 50 and platform 36; and the hinge may be attached to the outer edge 52 of the wall 48 at a leaf or knuckle of the hinge. If the bottom edge wall 48 is not present, the hinge may be attached to the platform at low edge 46. The anchor plate is attached to an opposite or second part of the hinge, whether to the second leaf or to the second alternating knuckle(s) of the hinge. The hinge interconnects the platform 36 and an anchor plate 54 to allow relative pivotal motion between the platform and the anchor plate on the axis of the hinge pin. With the hinge, the platform can be adapted to a sustained, substantially perfect fit with the contours of the vehicle floor and firewall.

In use, the anchor plate 54 is a base that supports the platform from the floor of the car. In preferred relationship, the anchor plate rests with its bottom surface 56 flat against the floor 30 of the car, which typically is a flat, substantially horizontal surface. The hinge 50 is attached to the anchor plate 54 no lower than the bottom surface 56, so that the hinge does not elevate the forward edge of the anchor plate when in use on the floor 30 of the car. The anchor plate can be formed with square cut narrow edges as previously described, providing a mounting location for the hinge at or above such a square cut narrow edge.

The platform 36 and the anchor plate 54 are configured to maintain a stable position on the vehicle floor by employing selective mass enhancement and distribution. A suitable material for forming each is a strong metal such as steel. The platform 36 is configured to support pressure from operation of a carried brake pedal. In addition, the platform is formed from sheet material having sufficient strength to maintain the elevation of the platform between the front or top wall 42 and the rear or bottom wall 48. Where the platform and walls 42, 48 are formed from a single sheet of material, the qualities and thickness of the sheet material may be selected with consideration for the forming or bending process. A typical thickness of sheet steel for forming the platform is about one-eighth inch.

The considerations for selecting a material to form the anchor plate are different. It is desirable for the anchor plate to have substantially greater mass than the platform in order to provide enhanced resistance to sliding and becoming dislocated while in use. At the same time, the two components are similar in size, as shown in FIG. 5, and this similarity is desirable to enable the two components to be folded into compact shipping position. To achieve these various goals, the mass of the anchor plate is increased by selecting a greater thickness of forming material. A typical thickness of steel sheet for forming the anchor plate is about one-quarter inch, or about double the thickness of the platform material. The mass of the anchor plate is preferred to be at least double the mass of the platform 36.

The hinge 50 carries a pivot locking mechanism to hold the platform 36 and anchor plate 54 in a variably selected relative position to fit accurately according to the preexisting angle between the floor 30 and firewall 32 of the given car. The preexisting angle can be matched with substantial accuracy, often to within a degree of exactness. When actuated, a suitable locking mechanism pinches together the knuckles of the hinge. An example of a locking mechanism is a nut 58 attached to a threaded, outwardly extending end of the hinge pin 60. The drawings illustrate a nut 58 on both extending ends of the hinge pin, which is suitable and provides a convenient method of preventing the hinge pin from rotating when one nut is being tightened or loosened.

FIG. 4 shows an advantage gained by having the adjustable hinge between the platform and anchor plates. With suitably sized plates, the anchor plate can be folded to the rear side of the platform into a shipping position. This arrangement is more efficient for shipping than with a brake platform having an open fixed angle.

The attachments of the hinge to the anchor plate 54 and platform 36 can be selectively made to enable desired relative folding-over and folding-under of the anchor plate. If the anchor plate and platform are unfolded to flat, parallel, oppositely extending positions, their position can be viewed as a straight angle, which is at one hundred eighty degrees.

If the anchor plate is folded under the platform to compact shipping position as shown or suggested by FIG. 5, their angular position is a reflex angle of between one hundred eighty and three hundred sixty degrees. The greater angle in the reflex range, to about a compact folded parallel position with an angle of three hundred sixty degrees, more or less, is efficient for boxing and shipping. It may be observed from FIG. 5 that the small offset between parallel planes created by the height of wall 48 could permit the anchor wall to fold slightly beyond full rotation of three hundred sixty degrees. Such greater folding-under is within the anticipation of the invention and is within the meaning of folding-under to compact shipping position.

With reference to FIG. 5, the anchor plate 54 is similar in size to the platform 36 in surface area. When the anchor plate is folded into compact shipping position as shown in FIG. 5, the length of the anchor plate as measured from the hinge 50 is slightly shorter than the length of the platform plus the first lower spacer 42, as measured from the hinge 50. This relative sizing allows the anchor plate 54 to fold behind the first lower spacer 42. In this way, the thickness of the folded-up auxiliary brake support 10 is minimized and the anchor plate is contained in the volume 37 under the planar platform and between the first and second lower spacers. The attachment of the anchor plate to hinge 50 is such that the folded up anchor plate fits into this volume 37 regardless of the reasonable thickness of the anchor plate. For example, it has been suggested that the anchor plate might have a thickness of one-quarter inch. Spacing 37 behind platform 36 easily accepts such a thickness of the anchor plate.

On the other hand, the anchor plate can be folded-up to a position crossing the plane of the platform 36. A folded-over or folded-up angle will be a contour-matching angle between the flat, typically horizontal car floor to the upward angled car firewall. Such a resulting angle is shown or suggested in FIGS. 1-4. Taking the fully open position of the anchor as a straight, one hundred eighty degree angle, the anchor might be folded up into the range of obtuse angles.

As an example, if the firewall 32 is angled up with respect to floor 30 by forty-five degrees, the anchor plate will be folded up approximately by this same amount. The resulting obtuse angle measured against the plane of the platform is a one hundred thirty-five degree obtuse angle.

The anchor plate and platform are adjustable over the described range of folded up and folded down positions. As a result, the auxiliary brake stabilizing assembly 10 can be securely fitted to the car floor and firewall, despite variations between car models of the angle of the firewall. The hinge lock secures the stabilizer 10 at the chosen angle. The anchor and platform plates also can be separated on the hinge for removal and replacement to modify mass or to supply a new component with improved performance. At the same time, the plates can be folded into compact shipping position for efficient handling.

As a result of the described features, the assembled auxiliary brake platform 34 achieves high accuracy of fit in the passenger side of a car, has high mass for resisting slippage and dislocation, and also ships efficiently.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. An auxiliary mounting stabilizer, in use for a carrying an auxiliary brake pedal over an underlying surface of a car with double brake foot controls, comprising:
    a platform, longitudinally disposed between opposite forward end and rearward end, configured with mounting structure for, in use, receiving an auxiliary brake pedal;
    a first lower spacer depending from said platform at said forward end thereof, in use to maintain said forward end in an elevated position relative to said underlying surface of said car;
    said first lower spacer defining a transverse lower gripping edge for application, in use, to the underlying surface of the car to prevent longitudinal slippage of the platform on the underlying surface of the car;
    a second lower spacer depending from the platform at said rearward end thereof, in use to maintain the rearward edge in an elevated position relative to the underlying surface of the car;
    said first lower spacer and said second lower spacer elevating the platform and defining a through-passage under the platform and defining open opposite lateral sides of said through-passage;
    an anchor plate;
    a folding hinge, pivotable on a laterally elongated hinge pin, attached between the platform at a lower end of the second lower spacer and a forward end of said anchor plate, and having a selectively applied pivot lock;
    wherein, said anchor plate and the platform are pivotable on said hinge from a straight angle to a folded-under reflex angle forming compact shipping position or to a folded-up obtuse angle forming a floor contour-matching position.

2. The auxiliary mounting stabilizer of claim 1, wherein said first lower spacer comprises:
    a spacer plate angled downward and forward from said forward edge of said platform at an angle less than a right angle, said spacer plate having a square cut, narrow end between top and bottom major surfaces perpendicular to said square cut, narrow end, defining said transverse lower gripping edge at an intersection of said square cut end and a selected one of said major surfaces.

3. The auxiliary mounting stabilizer of claim 2, wherein:
    said transverse lower gripping edge is formed at an intersection of said square cut end and said bottom major surface.

4. The auxiliary mounting stabilizer of claim 1, wherein said selectively applied pivot lock comprises:
    a threaded portion of said hinge pin; and
    a threaded fastener carried on said threaded portion of the hinge pin, tightenable thereon to lock the hinge.

5. The auxiliary mounting stabilizer of claim 1, wherein said selectively appliable pivot lock comprises;
    a pair of spaced apart threaded lengths of said hinge pin; and
    a threaded fastener carried on each of said threaded lengths, tightenable thereon to pinch lock the hinge.

6. The auxiliary mounting stabilizer of claim 1, wherein:
    said platform has preselected length and width and is formed from preselected sheet material having a preselected mass; and
    said anchor plate is formed from sheet material having at least double said preselected mass.

7. The auxiliary mounting stabilizer of claim 6, wherein:
    said anchor plate is sized in length such that, when folded-under at said reflex angle into compact shipping position, the anchor plate fits between said first lower spacer and said hinge.

8. The auxiliary mounting stabilizer of claim 1, wherein:
    said transverse lower gripping edge is wedge-shaped.

9. The auxiliary mounting stabilizer of claim 1, wherein:
    said anchor plate and said hinge are attached at a relative height such that the hinge does not extend below the anchor plate when the anchor plate and platform are disposed at said predetermined angle, whereby the hinge does not prevent the anchor plate from lying flat on said underlying floor surface.

10. A portable auxiliary mounting stabilizer loose laid in a car with double brake controls and having a floor surface and an upwardly, forwardly angled firewall surface meeting at a predetermined angle, with a rear portion of the stabilizer located on an underlying floor surface of said car and with a forward portion of the stabilizer located on an underlying firewall surface of the car, comprising:
    an auxiliary brake pedal;
    a planar platform, longitudinally disposed between opposite forward end and rearward end, configured with mounting structure receiving said auxiliary brake pedal on said platform;

a first lower spacer depending from said planar platform at said forward end thereof, maintaining said forward end in an elevated position relative to said firewall surface of said car;

said first lower spacer defining a transverse lower gripping edge applied to the firewall surface of the car, preventing longitudinal slippage of the planar platform on the firewall surface of the car;

a second lower spacer depending from the planar platform at said rearward end thereof, maintaining said rearward end in an elevated position relative to the underlying floor surface of the car;

said first lower spacer and said second lower spacer elevating the planar platform above the firewall surface and defining a laterally open through-passage under the planar platform and above the underlying firewall surface;

an anchor plate;

a folding hinge, pivotable on a laterally elongated hinge pin, attached between the planar platform at a lower end of the second lower spacer and a forward end of said anchor plate, whereby the anchor plate and the planar platform are mutually pivotable on said hinge pin, and the hinge pin has a selectively applied pivot lock;

wherein, the anchor plate and planar platform are folded on the hinge pin to an angle substantially matching said predetermined angle between the underlying firewall surface and underlying floor surface; and said selectively applied pivot lock is engaged, locking the anchor plate and planar platform substantially at said predetermined angle.

11. The auxiliary mounting stabilizer of claim 10, wherein said first lower spacer comprises:

a spacer plate angled downward and forward from said forward edge of said platform at an angle less than a right angle, said spacer plate defined by top and bottom major surfaces and a square cut narrow end, defining said transverse lower gripping edge at an intersection of said square cut end and a selected one of said major surfaces.

12. The auxiliary mounting stabilizer of claim 11, wherein:

said transverse lower gripping edge is formed at an intersection of said square cut end and said bottom major surface.

13. The auxiliary mounting stabilizer of claim 10, wherein said selectively applied pivot lock comprises:

a threaded length of said hinge pin; and a threaded fastener on said threaded length of the hinge pin, tightened thereon to lock the hinge angle.

14. The auxiliary mounting stabilizer of claim 10, wherein said selectively appliable pivot lock comprises;

a pair of separated threaded lengths of said hinge pin; and a threaded fastener on each of said threaded lengths, tightened toward each other and thereby pinch locking the hinge angle.

15. The auxiliary mounting stabilizer of claim 10, wherein:

said platform has preselected length and width and is formed from preselected sheet material having a preselected mass; and said anchor plate is formed from substantially the same sheet material and has at least double said preselected mass.

16. A portable auxiliary mounting stabilizer of claim 10, wherein:

said transverse lower gripping edge is wedge-shaped.

17. An auxiliary mounting stabilizer, in use for carrying an auxiliary brake pedal over an underlying interior floor surface of a car with double brake foot controls and with said interior floor surface formed of first and second floor sections oriented with respect to each other at a floor angle, comprising:

a platform, longitudinally disposed between opposite forward end and rearward end, configured with mounting structure for, in use, receiving an auxiliary brake pedal;

a first lower spacer depending from said platform at said forward end thereof, in use to maintain said forward end in an elevated position relative to said underlying surface of said car;

said first lower spacer defining a transverse lower gripping edge for application, in use, to the underlying surface of the car to prevent longitudinal slippage of the platform on the underlying surface of the car;

a second lower spacer depending from the platform at said rearward end thereof, in use to maintain the rearward edge in an elevated position relative to the underlying surface of the car;

said first lower spacer and said second lower spacer elevating the platform and defining a through-passage under the platform and defining open opposite lateral sides of said through-passage;

an anchor plate;

a folding hinge attached between the platform at a lower end of the second lower spacer and a forward end of said anchor plate, and having a selectively applied pivot lock;

wherein, said anchor plate and the platform are mutually pivotable on said hinge to, in use, orient the anchor plate and platform at said floor angle, such that the anchor plate fits on said first floor section and the platform fits on said second floor section.

* * * * *